United States Patent [19]
Barclay et al.

[11] Patent Number: 5,782,353
[45] Date of Patent: Jul. 21, 1998

[54] CAMERA CASING INTEGRATED WITH CARRY-STRAP

[75] Inventors: David Barclay, Bergen; James G. Rydelek, Henrietta, both of N.Y.; Albert E. Rieger, Unterboehringen, Germany

[73] Assignee: Eastman Kodak Company, Rochester, N.Y.

[21] Appl. No.: 816,974

[22] Filed: Mar. 13, 1997

[51] Int. Cl.$^6$ ............................................. G03B 17/08
[52] U.S. Cl. ............................................. 206/316.2; 396/29
[58] Field of Search .................. 206/316.2; 224/908; 294/139, 148, 149, 157; 396/27, 29, 423, 424, 535, 540; 359/511

[56] References Cited

U.S. PATENT DOCUMENTS

| | | | |
|---|---|---|---|
| 2,291,821 | 8/1942 | McNabb | 359/511 |
| 4,327,960 | 5/1982 | Gould | 359/511 |
| 5,325,139 | 6/1994 | Matsumoto | 396/27 |

*Primary Examiner*—Jimmy G. Foster
*Attorney, Agent, or Firm*—Roger A. Fields

[57] ABSTRACT

A camera casing provided with a flexible carry-strap which is secured to the camera casing to permit the carry-strap to extend as loop from the camera casing, is characterized in that an exterior elasticized overlay is arranged on the camera casing to serve as a ready hand grip for the camera casing and is integral with the carry-strap to make the carry strap similarly elasticized.

7 Claims, 8 Drawing Sheets

CAMERA CASING INTEGRATED WITH CARRY-STRAP

CROSS-REFERENCE TO RELATED APPLICATION

Reference is made to commonly assigned copending application Ser. No. 08/816,372, entitled ALTERNATIVE CAMERA CARRY-STRAP AND LENS CAP and filed Mar. 13, 1997, pending, in the names of David Barclay and James G. Rydelek.

FIELD OF THE INVENTION

The invention relates generally to the field of photography, and in particular to a camera casing that is provided with a flexible carry-strap.

BACKGROUND OF THE INVENTION

It is well known for a camera casing to be provided with a flexible carry-strap. Typically, the carry-strap is secured to the camera casing via a lug to permit the carry-strap to extend as loop from the camera casing. The loop is sized to serve as a wrist or neck strap.

Also, it is known for a camera casing to include an exterior hand grip which is manually grasped during picture-taking to minimize camera shake.

THE CROSS-REFERENCED APPLICATION

The cross-referenced application discloses a camera comprising a taking lens, and a carry-strap and associated lens cap attached to the camera. The carry-strap is configured to be looped around the camera in order to position the lens cap over the taking lens and, alternatively, to be extended as a loop from the camera in order to serve as a wrist or neck strap. Engageable means secures the carry-strap looped around the camera and as a loop extended from the camera.

SUMMARY OF THE INVENTION

A camera casing provided with a flexible carry-strap which is secured to the camera casing to permit the carry-strap to extend as loop from the camera casing, is characterized in that:

an exterior elasticized overlay is arranged on the camera casing to serve as a ready hand grip for the camera casing and is integral with the carry-strap to make the carry strap similarly elasticized.

DETAILED DESCRIPTION OF THE INVENTION

The invention is disclosed as being embodied preferably in a water-resistant one-time-use camera.

Because the features of a water-resistant one-time-use camera are generally known, the description which follows is directed in particular only to those elements forming part of or cooperating directly with the disclosed embodiment. It is to be understood, however, that other elements may take various forms known to a person of ordinary skill in the art.

Preferred Embodiment

Figure 1:
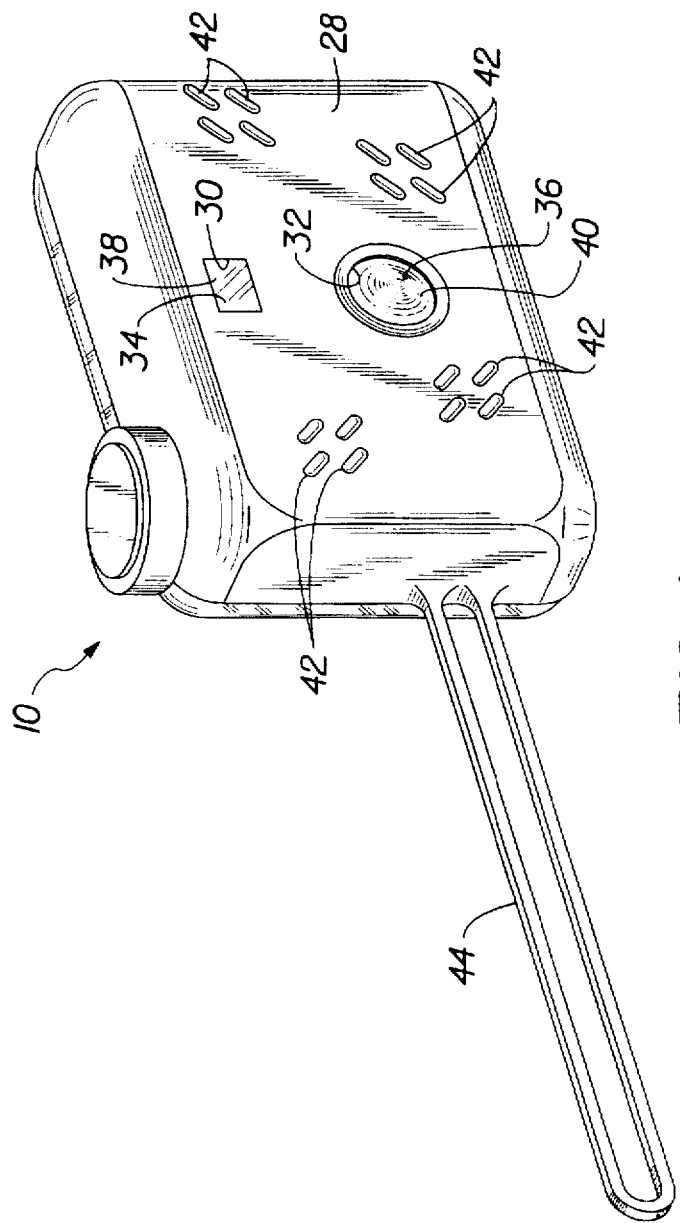
FIG. 1 is a front perspective view of a camera casing and a flexible carry-strap according to a preferred embodiment of the invention, showing the carry-strap formed in a loop.
Figure 2:
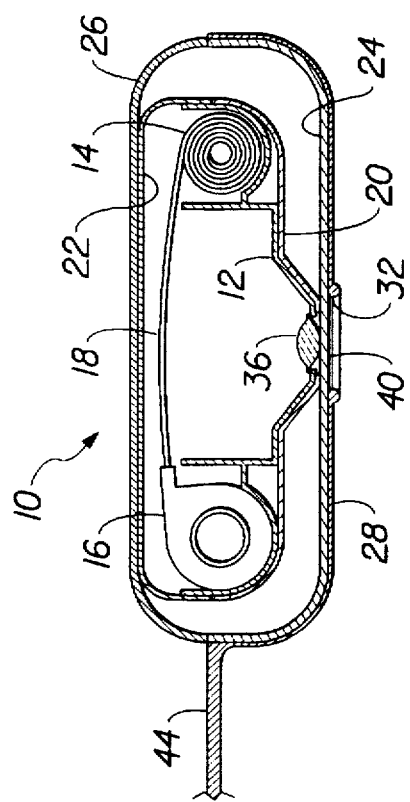
FIG. 2 is a sectional view of the camera casing and the carry-strap as depicted in FIG. 1.

Referring now to the drawings, FIGS. 1 and 2 show a water-resistant, plastic, one-time-use camera 10 comprising a main body part 12 holding an unexposed 35 mm film roll 14 and a light-trapping film cartridge 16 for receiving successively exposed frames of a filmstrip 18, a pair of opaque front and rear cover parts 20 and 22 which enclose the main body part, and a pair of transparent front and rear casing parts 24 and 26 which are heat-sealed together about the front and rear cover parts to form a water-resistant casing.

An exterior elasticized overlay 28, formed of rubber (or other elasticized water-impervious material) for example, is injection molded on the transparent front casing part 24 as shown in FIGS. 1 and 2. The exterior overlay 28 includes respective openings 30 and 32 for a front viewfinder window 34 and a taking lens 36 located behind individual portions 38 and 40 of the transparent front casing part 24, four sets of integral hand-grippable protuberances 42 and an integral carry-strap 44. The hand-grippable protuberances 42 and the carry-strap 44 are elasticized similar to the integral overlay 28. The carry-strap 44, as shown in FIG. 1, extends longitudinally as a permanent loop from the transparent front casing part 24. The loop is sized to receive one's hand or wrist, but can be made longer.

First Alternate Embodiment

Figure 3:
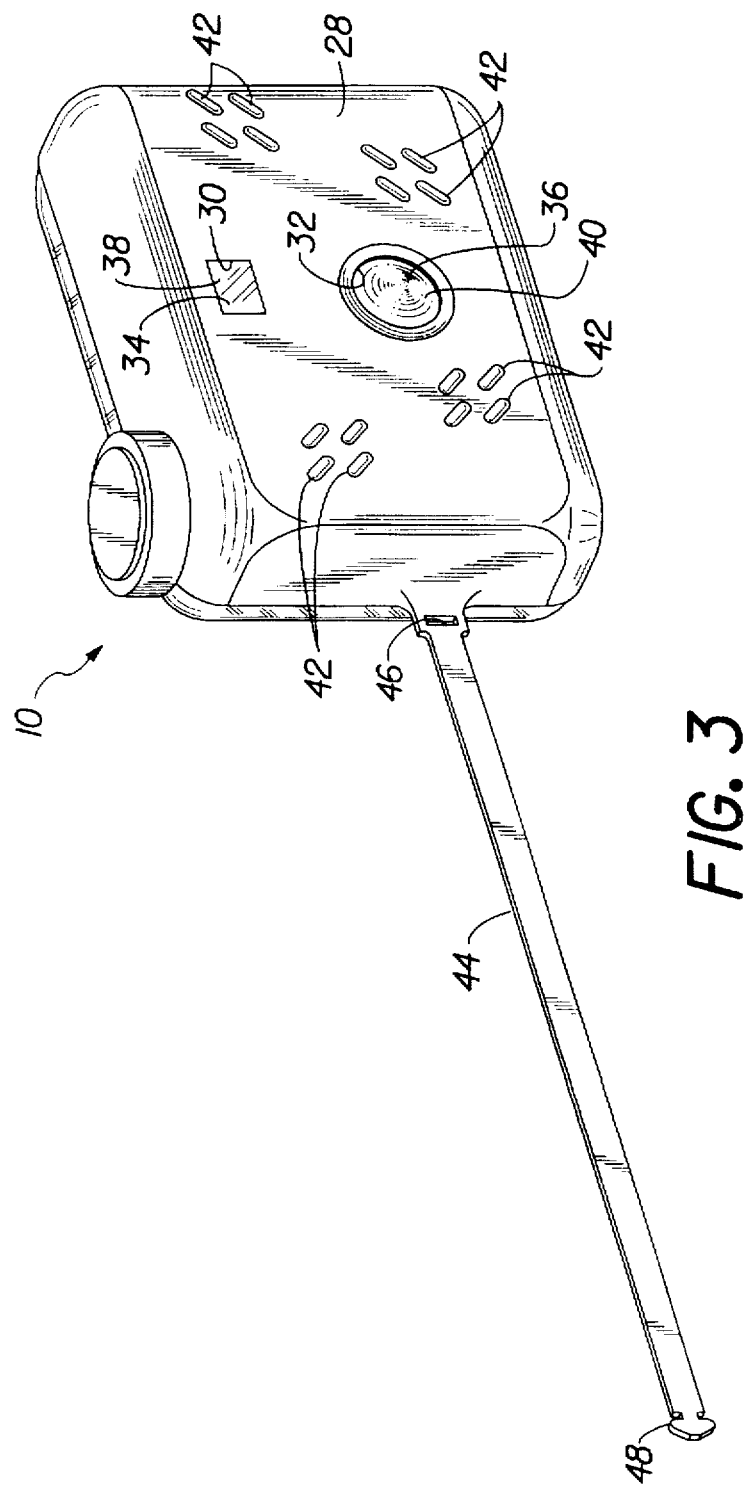
FIG. 3 is a front perspective view of a camera casing and a flexible carry-strap according to a first alternate embodiment of the invention, showing the carry-strap prior to being secured in a loop.
Figure 4:
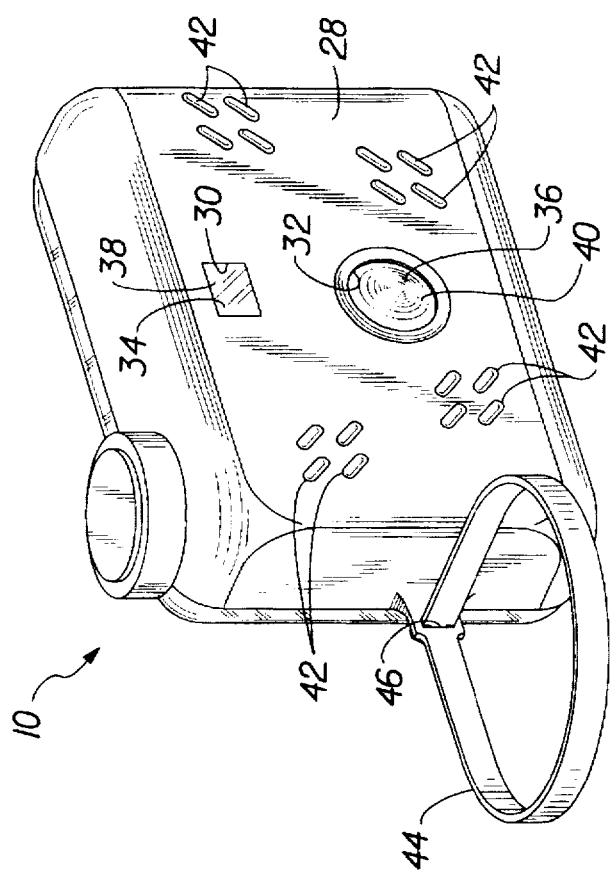
FIG. 4 is a front perspective view similar to FIG. 3, showing the carry-strap secured in a loop.

FIGS. 3 and 4 show a water-resistant one-time-use camera 10 which is substantially similar to the one in FIGS. 1 and 2 and, thus, is provided with the same reference numbers as in FIGS. 1 and 2, except that the carry-strap 44 is not in a permanent loop. In FIGS. 3 and 4, the carry-strap 44 has a through-hole 46 relatively close to the transparent front casing part 24, and it has a notched free end portion 48. The notched free end portion 48 is larger than the through-hole 46. This requires that the carry-strap 44 be stretched in the vicinity of the through-hole 46 to fit the notched free end portion into the through-hole as shown in FIG. 4, to loop the carry-strap 44.

Second Alternate Embodiment

Figure 5:
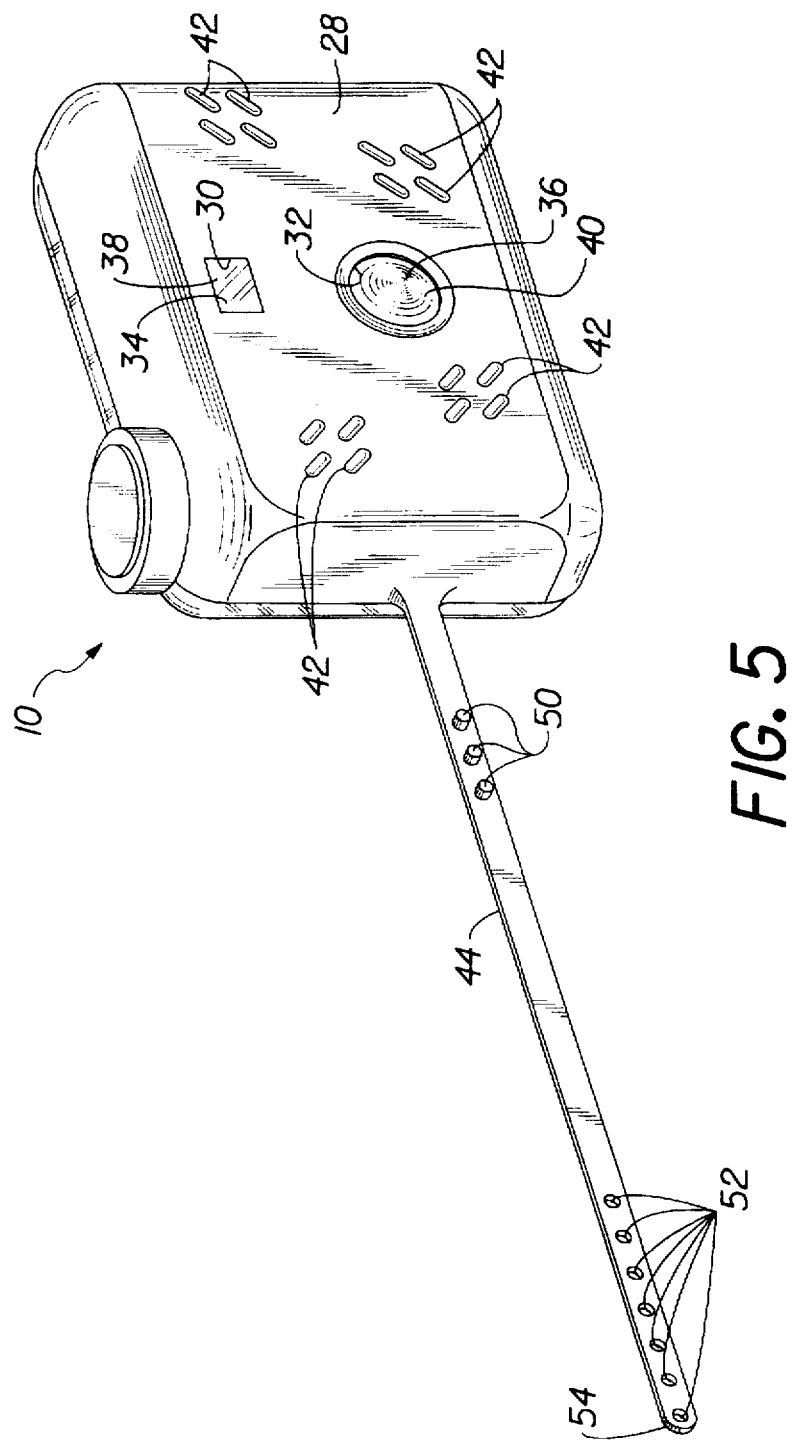
FIG. 5 is a front perspective view of a camera casing and a flexible carry-strap according to a second alternate embodiment of the invention, showing the carry-strap prior to being secured in a loop.
Figure 6:
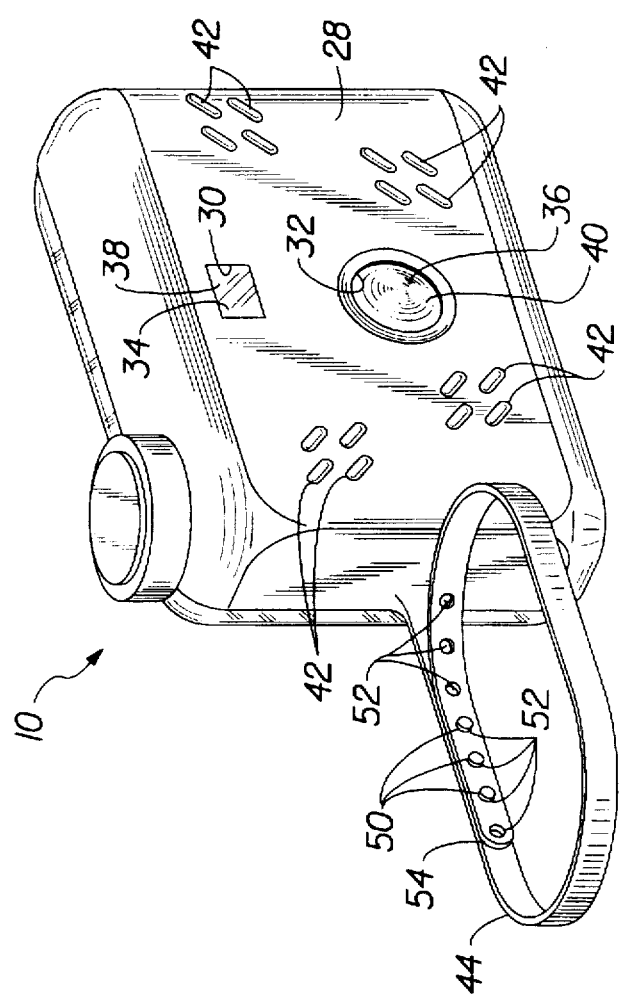
FIG. 6 is a front perspective view similar to FIG. 5, showing the carry-strap secured in a loop.

FIGS. 5 and 6 show a water-resistant one-time-use camera 10 which is substantially similar to the one in FIGS. 3 and 4 and, thus, is provided with the same reference numbers as in FIGS. 3 and 4, except that the carry-strap 44 is adjustable to form different size loops. In FIGS. 5 and 6, the carry-strap 44 has a series of evenly spaced protuberances 50 relatively close to the transparent front casing part 24, and it has a larger number of mating holes 52 relatively close to a free end portion 54 of the carry-strap. The protuberances 50 and a like number of the mating holes 52 couple as shown in FIG. 6, to form different size loops.

Third Alternate Embodiment

Figure 7:
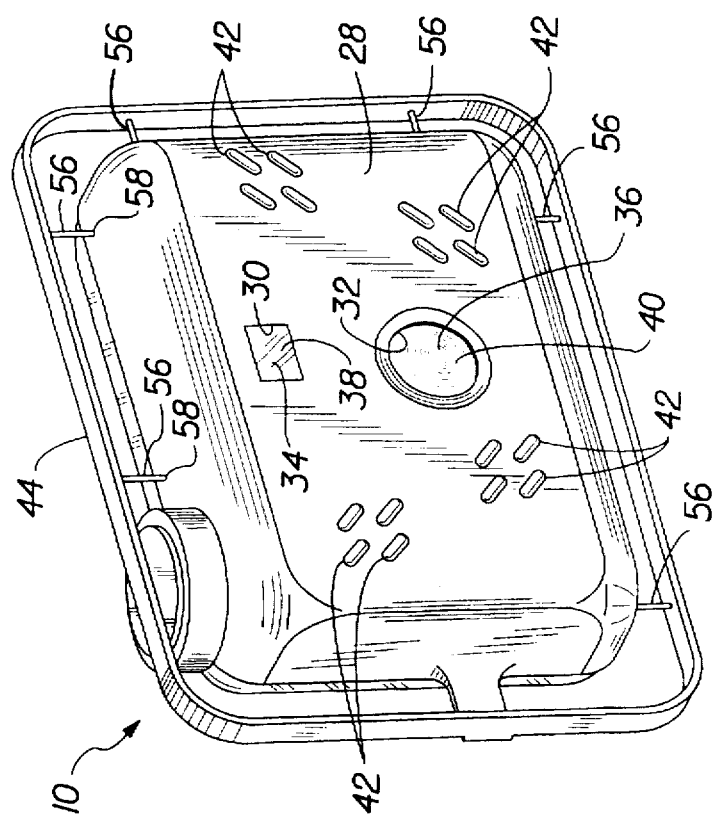
FIG. 7 is a front perspective view of a camera casing and a flexible carry-strap according to a third alternate embodiment of the invention, showing the carry-strap originally stretched about the camera casing for storage.
Figure 8:
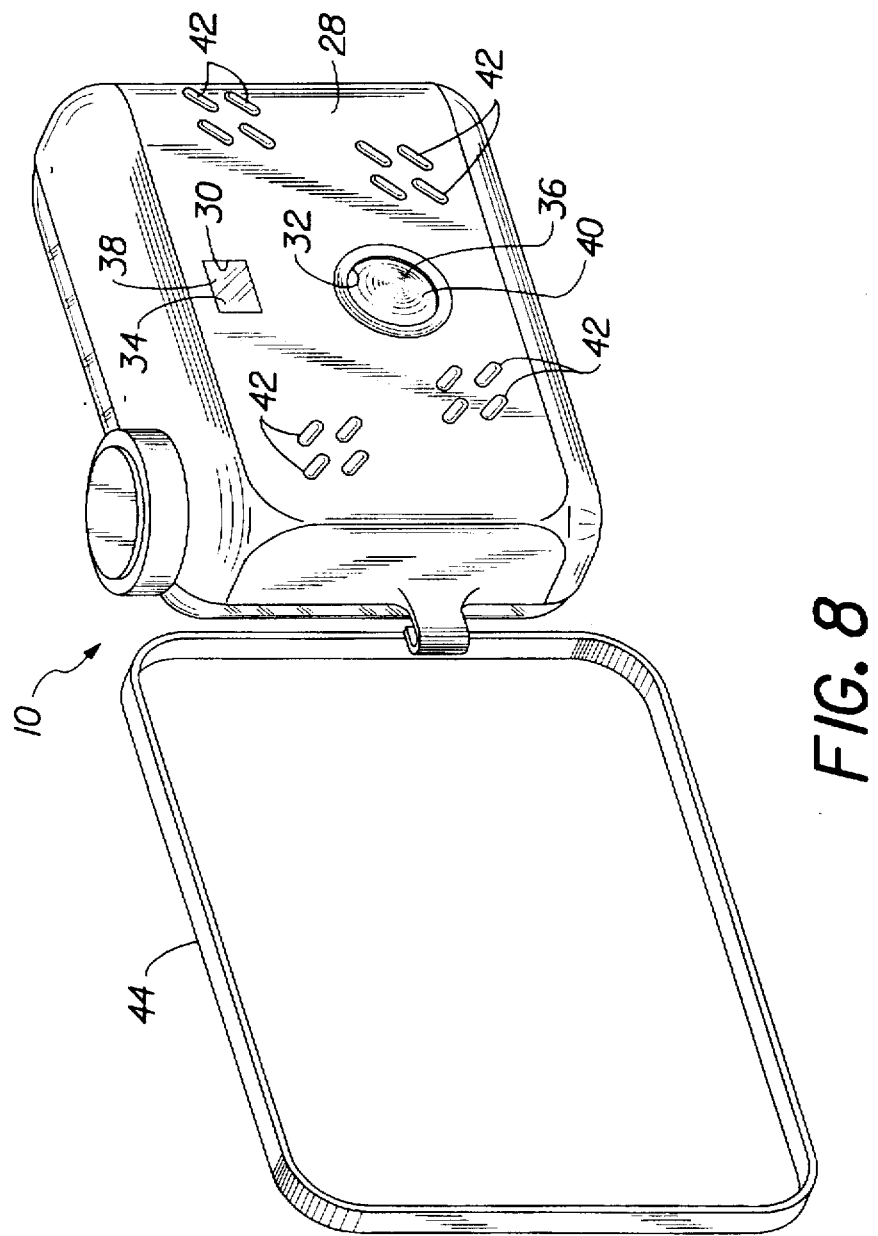
FIG. 8 is a front perspective view similar to FIG. 7, showing the carry-strap removed from about the camera casing for use.

FIGS. 7 and 8 show a water-resistant one-time-use camera 10 which is substantially similar to the one in FIGS. 1 and 2 and, thus, is provided with the same reference numbers as in FIGS. 1 and 2, except that the exterior overlay 28 includes a plurality of upstanding integral supports 56 which project from the exterior overlay and have respective weakened areas 58 that permit the upstanding supports to be readily broken or cut away from the exterior overlay and discarded. The carry-strap 44 can be initially stretched over the upstanding supports 56 for storage (prior to sale of the water-resistant one-time-use camera 10) before the upstanding supports are broken away from the exterior overlay 28 at their weakened areas 58.

The invention has been described with reference to a preferred embodiment. However, it will be appreciated that variations and modifications can be effected by a person of ordinary skill in the art without departing from the scope of the invention.

PARTS LIST
10. water-resistant one-time-use camera
12. main body part
14. unexposed film roll
16. film cartridge
18. filmstrip
20. front cover part
22. rear cover part
24. front casing part
26. rear casing part
28. exterior elasticized overlay
30. opening
32. opening
34. front viewfinder window
36. taking lens
38. casing portion
40. casing portion
42. hand-grippable protuberances
44. carry-strap
46. through-hole
48. notched free end portion
50. protuberances
52. mating holes
54. free end portion
56. upstanding supports
58. weakened areas

We claim:

1. A camera casing provided with a flexible carry-strap which is secured to said camera casing to permit said carry-strap to extend as loop from the camera casing, is characterized in that:

an exterior elasticized overlay is arranged immovably on said camera casing to serve as a ready hand grip for the camera casing, has respective openings for a camera taking lens and a camera viewfinder, and is integral with said carry-strap to make the carry strap similarly elasticized.

2. A camera casing as recited in claim 1, wherein said exterior elasticized overlay is arranged on a front portion of said camera casing and includes hand-grippable integral protuberances.

3. A camera casing provided with a flexible carry-strap which is secured to said camera casing to permit said carry-strap to extend as loop from the camera casing, is characterized in that:

an exterior elasticized overlay is arranged on said camera casing to serve as a ready hand grip for the camera casing and is integral with said carry-strap to make the carry strap similarly elasticized; and said carry-strap has mutual engagement means at respective locations relative close to and far from said camera casing for engaging one another to secure the carry-strap in said loop.

4. A camera casing as recited in claim 3, wherein at least one of said engagement means includes a plurality of evenly spaced engageable means that can be selectively engaged by the other engagement means to vary the size of said loop.

5. A camera casing as recited in claim 3, wherein at least one of said engagement means is a through-hole in said carry-strap and the other engagement means is a strap portion that is larger than said through-hole to require that the carry-strap be elastically stretched in the vicinity of the through-hole to fit said strap portion into the through-hole.

6. A camera casing as recited in claim 3, wherein said camera casing includes a plurality of upstanding supports which project from the camera casing and have respective weakened areas that permit said supports to be broken away from the camera casing and discarded, and said carry-strap can be elastically stretched over said supports for storage before the supports are broken away from said camera casing.

7. A camera casing as recited in claim 3, wherein said camera casing has a transparent front portion, and said exterior elasticized overlay is arranged on said transparent front portion of the camera casing and includes an opening for revealing a relatively small area of the transparent front portion.

* * * * *